United States Patent
Zhou et al.

(10) Patent No.: US 11,256,703 B1
(45) Date of Patent: Feb. 22, 2022

(54) SYSTEMS AND METHODS FOR DETERMINING LONG TERM RELEVANCE WITH QUERY CHAINS

(71) Applicant: A9.com, Inc., Palo Alto, CA (US)

(72) Inventors: Yichen Zhou, Ithica, NY (US); Vamsi Salaka, Fremont, CA (US); Matthew Carlin, Palo Alto, CA (US); Francois Huet, Santa Cruz, CA (US)

(73) Assignee: A9.COM, INC., Palo Alto, CA (US)

(*) Notice: Subject to any disclaimer, the term of this patent is extended or adjusted under 35 U.S.C. 154(b) by 647 days.

(21) Appl. No.: 15/817,938

(22) Filed: Nov. 20, 2017

(51) Int. Cl.
*G06F 16/00* (2019.01)
*G06F 16/2457* (2019.01)
*G06Q 30/06* (2012.01)
*G06F 16/21* (2019.01)
*G06F 16/28* (2019.01)

(52) U.S. Cl.
CPC ...... *G06F 16/24575* (2019.01); *G06F 16/219* (2019.01); *G06F 16/285* (2019.01); *G06Q 30/0625* (2013.01)

(58) Field of Classification Search
CPC .. G06F 16/24575; G06F 16/285; G06F 16/35; G06F 16/2453
USPC .................................................. 707/740, 713
See application file for complete search history.

(56) References Cited

U.S. PATENT DOCUMENTS

| | | | |
|---|---|---|---|
| 6,983,272 B2* | 1/2006 | Davis | G06Q 30/04 707/748 |
| 7,970,754 B1* | 6/2011 | Jarboe | G06Q 30/02 707/713 |
| 8,055,638 B2* | 11/2011 | Schechter | G06F 16/951 707/705 |
| 8,364,529 B1* | 1/2013 | Zwicky | G06Q 30/0244 705/14.4 |
| 9,009,146 B1* | 4/2015 | Lopatenko | G06F 16/9535 707/723 |
| 9,342,600 B1* | 5/2016 | Das | G06F 16/951 707/707 |
| 2003/0018634 A1* | 1/2003 | Shringeri | G06F 16/2428 707/707 |
| 2010/0161643 A1* | 6/2010 | Gionis | G06F 16/24534 707/765 |
| 2010/0287185 A1* | 11/2010 | Cras | G06F 16/242 707/769 |

(Continued)

*Primary Examiner* — Alexandria Y Bromell
(74) *Attorney, Agent, or Firm* — Hogan Lovells US LLP

(57) ABSTRACT

Embodiments of the present invention provide improved techniques for determining long term relevance and user behavior using query chains. The query chains may be first be detected and then annotated into different types of chains based at least in part on various decision rules, machine-learned classifiers, and inter-query relationships. The query chains may then be subsequently used to train models for predicting user behavior and providing more relevant results to a user's queries. A content provider system according to various embodiments may aggregate historical data associated with previous search and/or transaction data, which may be analyzed to detect query chains, for example, whether queries are chained to each other. Determining whether queries are chained to each other may involve incorporating decision rules and reformulation models, analyzing temporal windows between queries, and/or analyzing inter-query relationships.

20 Claims, 12 Drawing Sheets

(56) References Cited

U.S. PATENT DOCUMENTS

| | | | |
|---|---|---|---|
| 2011/0231380 A1* | 9/2011 | Sadagopan | G06F 16/951 707/706 |
| 2014/0012799 A1* | 1/2014 | Eberlein | G06F 16/3331 707/603 |
| 2014/0201126 A1* | 7/2014 | Zadeh | A61B 5/165 706/52 |
| 2016/0335302 A1* | 11/2016 | Teodorescu | G06F 16/2228 707/707 |

* cited by examiner

SYSTEMS AND METHODS FOR DETERMINING LONG TERM RELEVANCE WITH QUERY CHAINS

BACKGROUND

As users increasingly access content electronically and conduct transactions electronically over the Internet, content providers are presented with the problem of processing extremely large amounts of user data in an efficient and intelligent manner to improve the way in which content is delivered to these users. Processing and analyzing user data is critical for training behavioral models to predict user behavior using limited amounts of historical data as input. Many content providers specifically select content for certain pages or other interfaces to be displayed to particular users. For example, a user might search for information about a keyword through a search engine. When a results page is returned to the user that includes search results relating to that keyword, content that may be of interest to the user and relevant to the search can be included with the results page that relates to the keyword and/or search results. Often, the content includes a hypertext link or other user-selectable element that enables the user to navigate to another page or display relating to the advertisement.

In conventional approaches, large amounts of data may be stored and analyzed using a single computer equipped with sufficient processing power, which can be costly, inefficient, or inaccurate because of biases trained into the behavioral model. Other conventional approaches may divide the data into more digestible blocks for training individual models and then the individual models may be averaged or merged. However, averaging or margining individual models often introduces unnecessary variances and biases, which also results in inaccurate models for user behavior. For example, a user may be associated with a category when the user visits a page, performs a search, or views content associated with that category. For example, a user viewing a page of content relating to cameras may be associated with a camera category and thus may receive advertising relating to cameras. However, the user may have been looking for something only tangentially related to cameras, or might have only visited a camera page once for a particular reason. Thus, conventional approaches do not optimally reflect the interests of various users, and do not allow advertisers to easily determine the appropriate users, or categories of users, to target.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to analyzing customer relevance long term. Embodiments of the present invention illustrate long term relevance between users and products of interest as a query chain. Products of interest may initially be relevant products that users queried for in a search and a conversion occurs when the user eventually completes the query by purchasing the relevant product. Query chains may be used, according to embodiments of the present disclosure, to improve and enhance product search, as previous query chains of a particular customer, or a body of users, may be analyzed for patterns. Query chains may be mined from a database storing raw data between users and products. Additionally, query chain information may be incorporated into training behavioral models that predict user behavior from a search query and conversion into a purchase.

Existing methods and systems for product or item query searching have various limitations and technical problems. For example, when a user enters a query, existing search systems may be inaccurate in determining relevant search results in response to the query. The query may be too broad for the search system to determine what results are most relevant to the user and are most likely to convert into a purchase. Search results that do not return relevant results to the user are inefficient, as the user and the search system resort to multiple iterations of search queries before the search system returns what the user is looking for. In that time, the user may lose interest and never convert the query into a purchase. Furthermore, existing search systems may not have sufficient data across different users and different products to accurately detect, annotate, and/or mine query chains from the data gathered that is associated with previous search queries and/or transactions, including purchases.

Embodiments of the present disclosure resolve the problem of broad queries, among other things. Search content provider systems of the present disclosure may propagate positive feedback from previous properly related queries. As such, search content provider systems may incorporate query chain analysis to understand the relation among different queries that users may make for a product, and predict the relevant product a user is searching for with an initial broad query.

Figure 1:
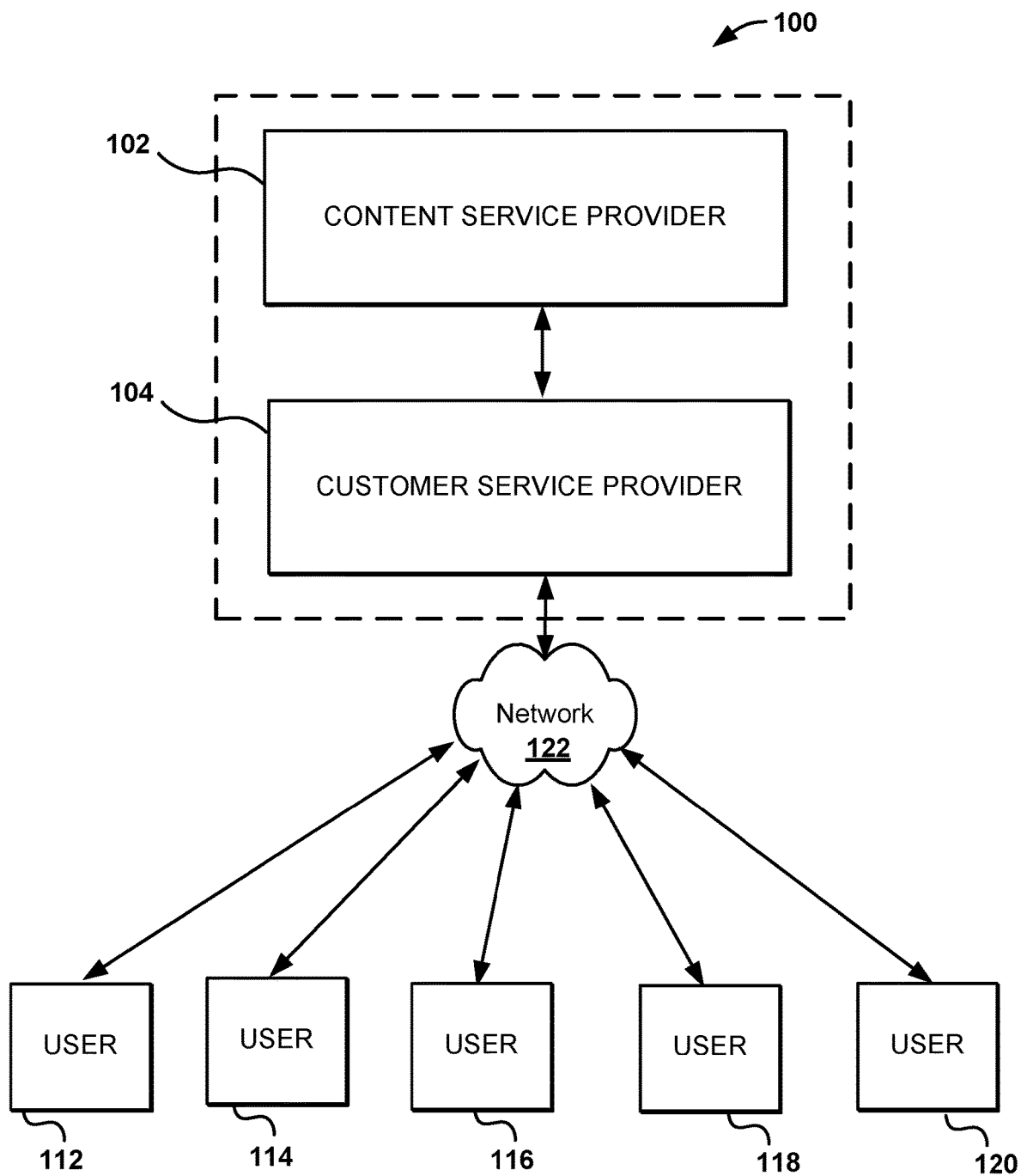
FIG. 1 illustrates an example high-level system for performing query chain analysis in accordance with one embodiment.

FIG. 1 illustrates a high-level overview of a system 100 according to various embodiments of the present disclosure. The system 100 may include a customer service provider 102 and a content provider 104. The customer service provider 104 may be a retailer or other entity that provides services and/or products directly to users. In some embodiments, the content provider 104 may provide content, hosting, and/or analytics services to the customer service provider 102. In other embodiments, the content provider 104 and the customer service provider 102 may be operated by the same entity. The customer service provider 102 and/or content provider 104 may be operatively coupled to various users 112, 114, 116, 118, and 120 via a network 122, such as the Internet, an intranet, a local area network, a cellular network, or another appropriate wired and/or wireless network.

Figure 2:
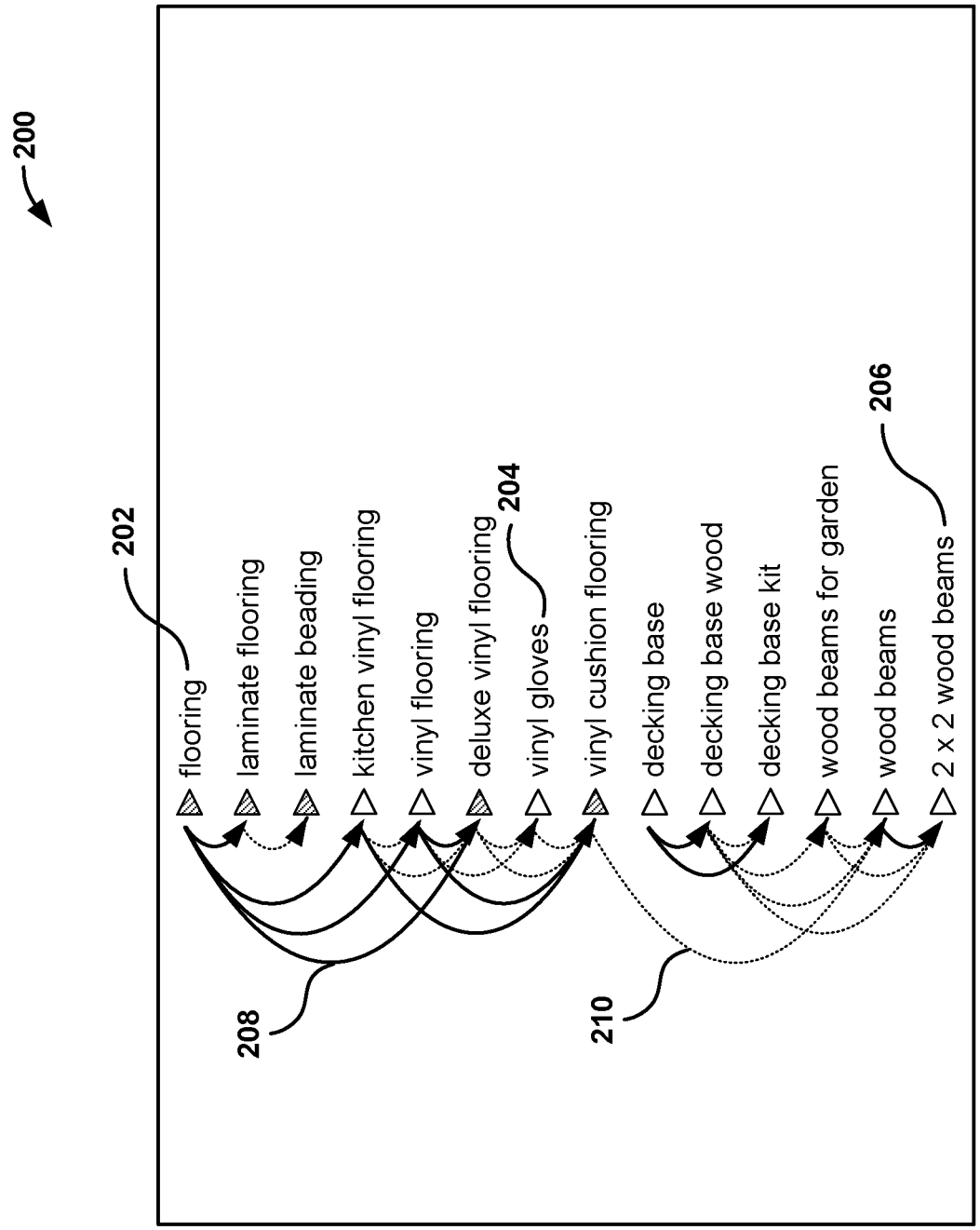
FIG. 2 illustrates an example query chain in accordance with one embodiment.

FIG. 2 illustrates examples of broad queries 200 according to various embodiments of the present disclosure. Embodiments of the present disclosure resolve the problem of broad queries, which may be too broad for the search system to determine what results are most relevant to the user and are most likely to convert into a purchase. A search session with queries that are too broad may include a number of queries entered by a user for a product or item in a search. For example, the user may enter various words in 200, such as "flooring" 202, "laminate flooring," "laminate beading," "kitchen vinyl flooring," "vinyl flooring," "deluxe vinyl flooring," "vinyl gloves" 204, "vinyl cushion flooring," "decking base," "decking base wood," "decking base kit," "wood beams for garden," "wood beams," and "2×2 wood beams" 206. Individually, each of these search queries may return a wide range of results which may or may not be relevant to the user, as demonstrated by query chains 208 as relevant, represented by solid lines, and query chains 210 as less relevant, represented by dotted lines. Chaining "flooring" 202 to "laminate flooring" or "vinyl flooring" may be relevant but the chain is not necessarily narrowed because "flooring" 202 may be chained to so many different and varied terms. For example, "flooring" 202 may be chained to "deluxe vinyl flooring" and then "vinyl gloves" 204, which may be a completely irrelevant result that the user was not looking for when the initial search query "flooring" 202 was entered.

Figure 3:
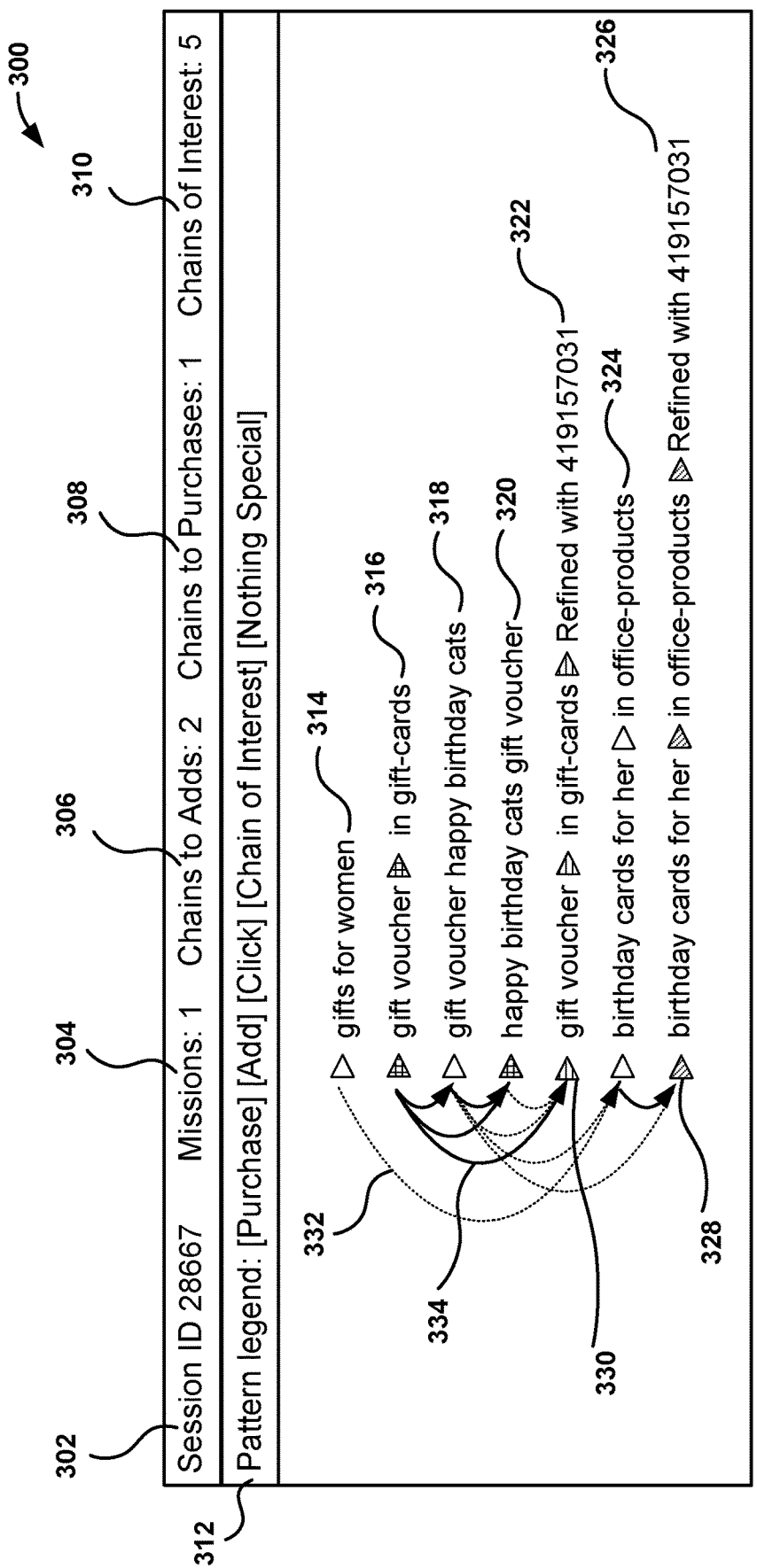
FIG. 3 illustrates an example annotation of a query chain in accordance with one embodiment.

According to an embodiment of the present disclosure, a content provider system providing searching service to users may first detect and annotate query chains from data collected from previous transactions and searches. FIG. 3 illustrates a display 300 of example query chains according to various embodiments of the present disclosure. Display 300 may include a session identifier 302 which identifies a unique search session. A search session may be initiated when a user enters a query for a product or item in a search. The search session may include one or more missions 304, such as a shopping mission with a particular product as a goal of the search session. The display 300 may include several query chains 314, 316, 318, 320, 322, 324, and 326 associated with the session ID 302 and the mission 304. A query chain may be a sequence of reformulated queries. In a product search setting, a query chain may then be reformulated as a sequence of queries sharing the same shopping intent or mission 304. The query chains 314, 316, 318, 320, 322, 324, and 326 may be pattern coded by the pattern legend 312 indicating what type of chain it is, for example a chain to add 306, a chain to purchase 308, and/or chains of interest 310. For example, according to the pattern legend 312, chains of interest 310 may be indicated by solid line arrows 334. In this example, there are five chains of interest 310: a chain from query chain 316 to query chain 318, a chain from query chain from 318 to query chain 320, a chain from query chain 316 to query chain 320, a chain from query chain 316 to query chain 322, and a chain from query chain 324 to query chain 326.

Chains to purchase 308 may be indicated by a pattern according to the pattern legend 312. For example, triangle 330 may be pattern coded to indicate that query chain 322 is a chain to purchase 308. Chains to add 306 may be indicated by another pattern according to the pattern legend 312, such that triangle 328 may be the pattern indicating that query chain 326 is a chain to add 306. Dotted line arrows 332 may indicate chains that are "nothing special" according to the pattern legend 312. In other embodiments, pattern legend 312 may be represented as a color legend, where different chains may be color coded (e.g., identified based on different patterns). As shown in example display 300, there may be several types of queries. Queries 314, 318, and 320 are chains with only one query (e.g., one search term). Query 314 is "gifts for women" while other queries, such as 318 and 320 may be more specific, for example "gif voucher happy birthday cats" 318 and "happy birthday cats gift voucher" 320. Other queries may have several linked terms in sequence. For example, query chain 316 may initially start with the user querying "gift voucher," but then based on the search results, refine the search to include "in gift cards."

Detecting the query chains shown in FIG. 3 may involve a reformulation model that is based at least on textual, semantic, and temporal features extracted from query pairs identified in historical transaction data. The reformulation model may implement decision rules and machine learned models to classify query pairs as being chained or not.

TABLE 1

| Available Features for Extraction | | |
|---|---|---|
| Textual | Semantic | Temporal |
| Cosine distance | Same Product ID | Elapsed time |
| Levenshtein distance | Product type | Time of the day |
| Shared words | Search alias | |
| Prefix/suffix | | |
| Query lengths | | |

Query detection may also involve moving temporal windows, in which the content provider according to an embodiment may consider queries chained if and only if they are issued within short time period from each other and/or based on a confidence value. For example, queries that are entered in quick succession sequentially are more likely to be chained because the user entered them within a short temporal window, which tends to indicate a relevance between multiple sequential queries. According to various embodiments, the temporal window in between queries may be pre-determined, or may be dynamic. For example, the system may calculate and calibrate different thresholds of time to indicate whether queries may be relevant to each other. The queries may also have a confidence value calculated, indicating a level of confidence in the accuracy or precision of the query and a relevance between multiple queries. The confidence value may be calculated based at least in part on historical transaction data and/or temporal windows. For example, in a web search setting, only queries with 91% accuracy and precision may be considered. In various embodiments, a confidence threshold may be pre-determined or may be dynamic, such that the confidence threshold may be calibrated and calculated as more query chains are detected.

In determining whether queries are relevant to each other to create a query chain, according to various embodiments, the content provider system may apply several decision rules. An extending rule may determine that search queries that add or extend the previous query with additional qualified or descriptors are chained. Table 2 below demonstrates example decision rules according to an embodiment of the present disclosure. For example, as shown in Table 2: Decision Rules, a query for "kettle" and then a subsequent query for "quick boil kettle" are likely to be chained because the subsequent query extends the first query by adding "quick boil" to the original search query "kettle." Another rule may include chaining queries where the subsequent queries are to correct typos from a previous query. For example, in Table 2, a first query of "cripsy tofu" and a second query of "crispy tofu" are likely to be chained because the second query fixes the typo in the first query. Other rules may include entering an alias or a product type, as shown below in Table 2.

TABLE 2

Examples of Decision Rules

| Rule | Example | Decision |
|---|---|---|
| Extending | Kettle → quick boil kettle | Yes |
| Correcting typo | Cripsy tofu → crispy tofu | Yes |
| Entering alias | Kettle (aps) → kettle (kitchen) | Yes |
| Product type | Basketball → 24" monitor | No |

According to various embodiments, the content provider system may also implement other types of decision rules. Table 3 demonstrates another variation of decision rules according to another embodiment of the present disclosure.

TABLE 3

Another Example of Decision Rules

| Is the Downstream (Second) Query | Relationship to the Upstream (First) Query |
|---|---|
| Same keywords | Chained |
| Extending | Chained |
| Truncating | Chained |
| Same Product Type | Chained |
| ≤2 edit distance | Chained |
| Long Elapsed Time (Large Temporal Window) | Not Chained |

As shown above, the decision rules in Table 3 may represent similar decision rules as in Table 2, for example, same keywords, extending, truncating (e.g., eliminating words in a subsequent query from a first query), and same product type. In other embodiments, the decision rules in Table 3 may incorporate various aspects of the reformulation model, such as a cosine or Levenshtein distance of "<2 edit distance," to indicate that queries are chained. In another embodiment, the decision rules may also incorporate aspects of a moving temporal window, for example when a large temporal window has been detected (e.g., a long elapsed time between queries), then the queries may be determined to not be chained to each other.

Figure 4:
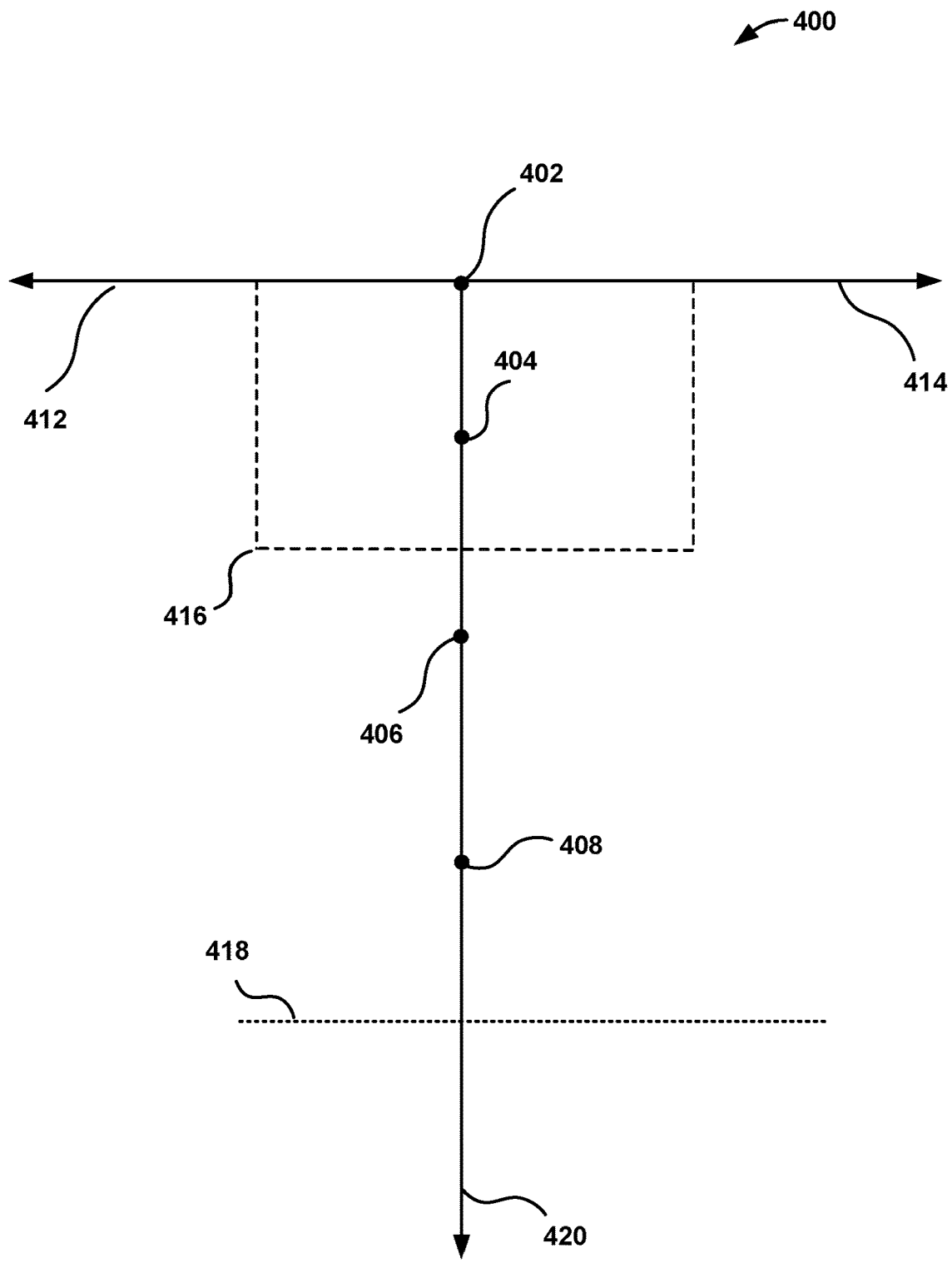
FIG. 4 illustrates an example of inter-query relationships in accordance with one embodiment.

According to an embodiment of the present disclosure, the content provider system may also determine relationships between queries. FIG. 4 illustrates an example graph 400 of how queries may be related to each other according to various embodiments of the present disclosure. As shown in graph 400, there may be an axis of specificity that is a sliding spectrum ranging from the most specific 412 to the most general 414, and orthogonal to this axis of specificity is an axis of similarity that is another sliding spectrum ranging from an exact match (e.g., same query) 402 to dissimilarity 420. Based on where a query falls on the axes of specificity and similarity, they may be categorized into several different labels for inter-query relationships based on shopping intent or mission.

On the specificity axis, the spectrum ranges from the most specific 412 to the most general 414. Bounding box 416 may provide threshold ranges for the range of allowable specificity and similarity for queries that are most likely to be chained. The bounding box 416 may include a range of threshold values for specificity and a threshold for similarity (e.g., a threshold deviance from an exact match). Queries that skew too far to the most general end of the spectrum 414 may result in increased recall, such as a query that requires the user to iterate with more queries to increase the search results returned. For example, the query chain "go explore business backpack→go explore backpack" returns more search results than the upstream query "go explore business backpack."

On the other end of the axis or spectrum, queries that are the most specific 412 may result in decreased recall. For example, the query chain "shower rail→shower rail bath plastic slide for glass" returns less search results than the upstream query "shower rail," which may return too many results that are not relevant to the user. In a moderate range on the axis of specificity intersecting with the axis of similarity may include a range of queries that are likely to be chained 416 because they fall within a range of specificity and a range of similarity (e.g., a threshold deviance from an exact match). For example, queries that are the same 402 and queries that correct errors 404 (e.g., subsequent queries to correct typos) are likely to fall within the bounding box 416 that determines they are chained queries.

Further along the axis of similarity towards dissimilarity 420, queries that fall outside of the threshold of similarity defined by bounding box 416 for chained queries may be queries that i include equivalent rephrasing 406. Equivalent rephrasing includes queries having different wordings for the same intent. For example, the query chain "savings jar smashable→smash saving jar" may be labeled as different queries that effectively produce the same result.

Another threshold along the similarity axis may be defined at 418. Queries that fall outside of the bounding box 416 but within threshold 418 may include queries that are parallel moves 408. A parallel move query 408 may be a query that results in a different recall with the same intent. For example, the query "37 inch tv→40 inch tv" may refer to the same intent because relevant results would be the same product, but are distinguished by specific features of the product.

Queries on the spectrum of similarity that fall outside of the threshold 418 may be on the verge of dissimilarity 420, and as such, may be categorized as mission changes 410. A mission change query 410 may be queries that are so different that it tends to indicate a change of intent or mission of the search or shopping session. For example, a query chain "runner pack→running belt" may indicate a user's change of intent from looking for bags used for running to simply a belt for running.

Figure 5:
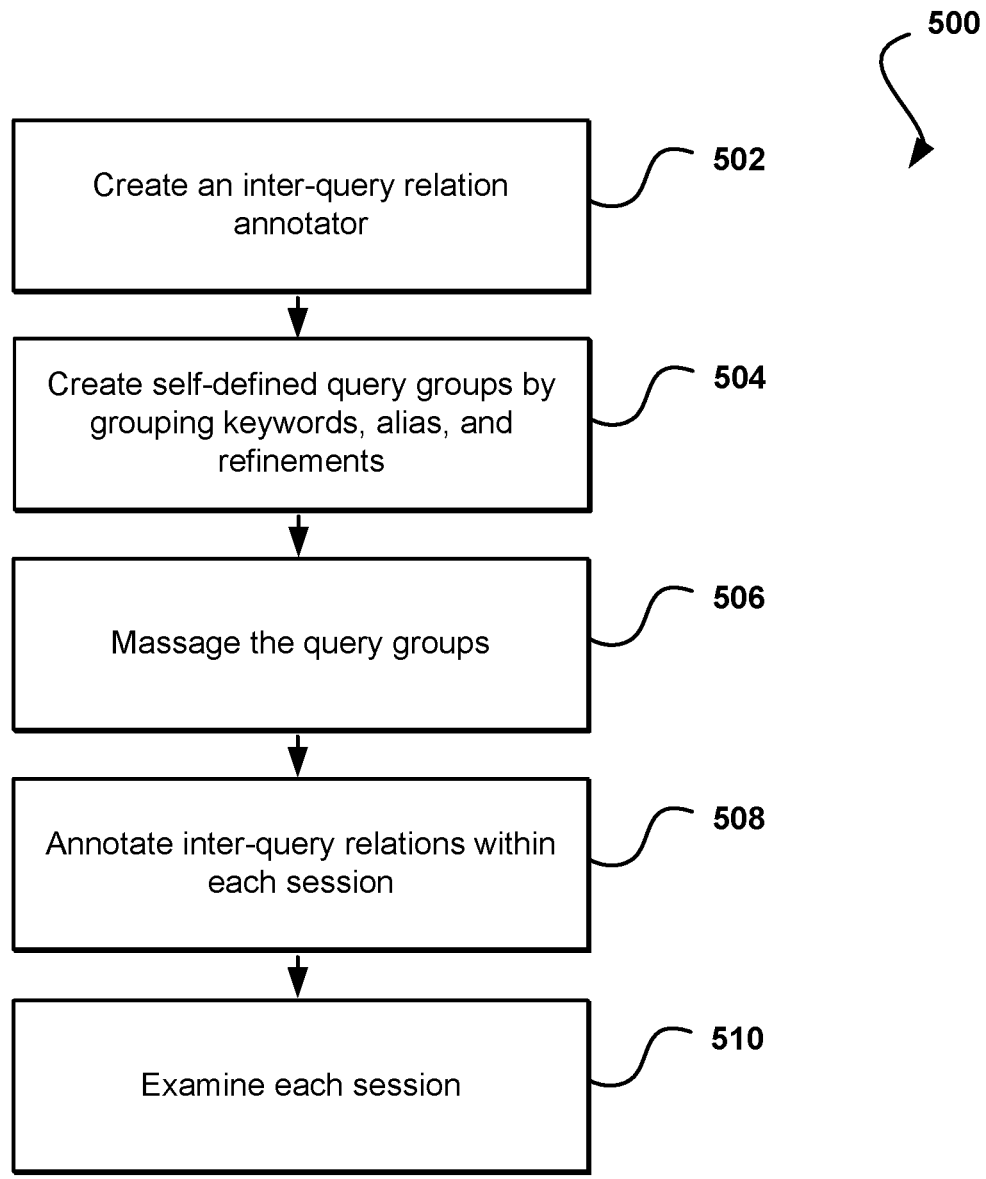
FIG. 5 illustrates an example method of annotating a session in accordance with one embodiment.

According to various embodiments, to provide the query chains displayed in a session shown in FIG. 3, including classifying them as "chains to add" and "chains to purchase" for example, query chains may be annotated and grouped based at least in part on the decision rules and inter-query relationships. FIG. 5 illustrates an example method 500 of annotating queries within a session. At step 502, an inter-query relation annotator may be created based at least in part on a fusion of decision rules and machine-learned classifiers.

For simpler queries, only decision rules may be sufficient in annotating inter-query relationships. However for more complex queries, than additional classifiers may be needed, such as machine-learned classifiers determined from training behavioral models.

At step 504, self-defined query groups may be created. The self-defined query groups may be created based on searches on specific datasets that have aggregated historical search and/or transaction data for various users. In some embodiments, the self-defined query groups may be grouped by keywords, alias, and/or other refinements. At step 506, the self-defined query groups may then be massaged into various categories, for example, the query groups may be further distinguished by user and/or session, and may be ordered by time. In some embodiments, processing the session may include appending query understanding annotation. Next, at step 508, the content provider system of the present disclosure may annotate inter-query relations within each session. Subsequently, at step 510, the results may be examined and submitted for visualization, for example, as shown by the query chains displayed in FIG. 3.

Figure 6:
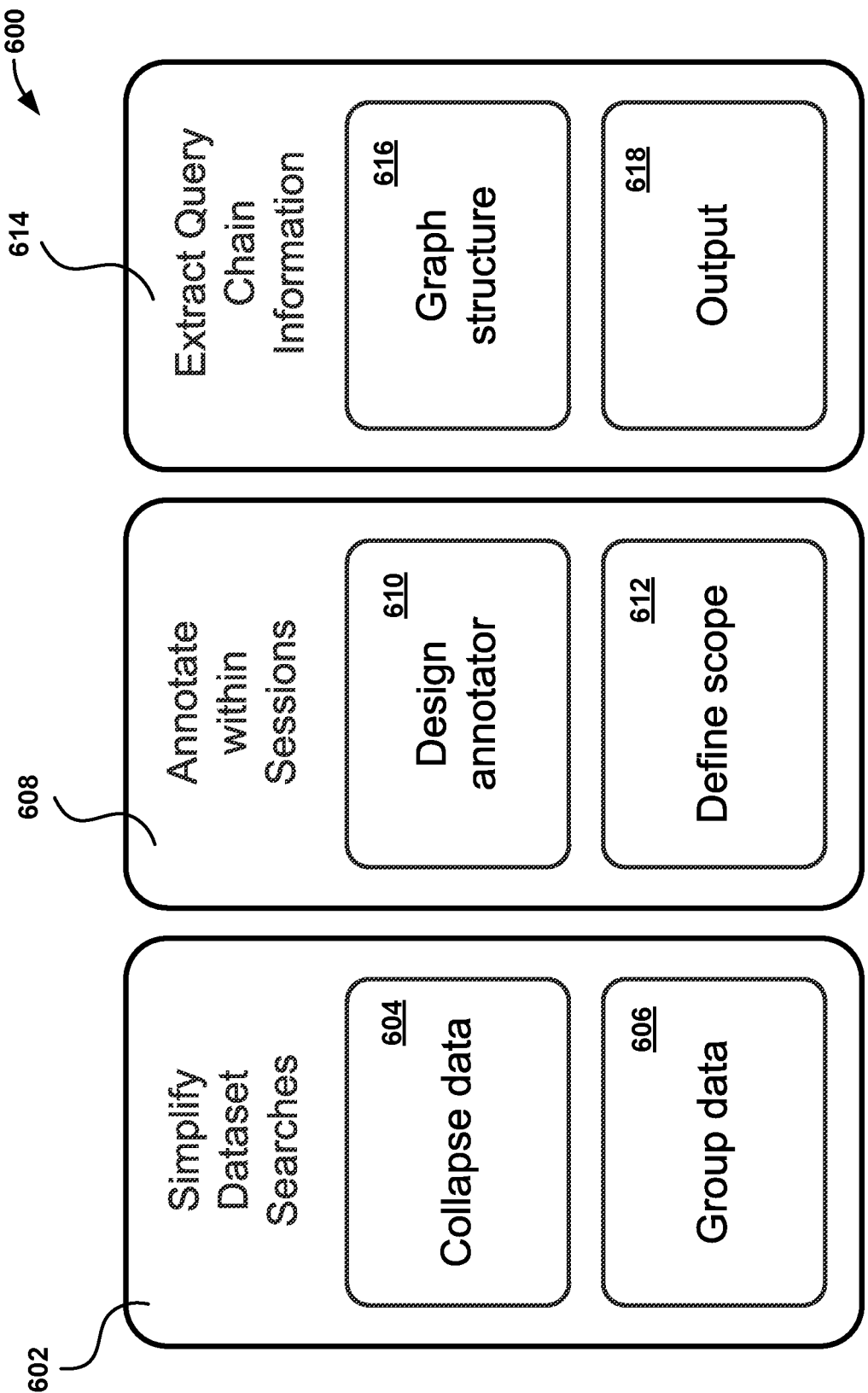
FIG. 6 illustrates an example overview method of analyzing query chains in accordance with one embodiment.

FIG. 6 illustrates an example high-level overview method 600 of detecting and annotating queries according to another embodiment of the present disclosure. Query chain analysis may include three major processes: simplifying dataset searches 602, annotating within sessions 608, and extracting query chain information 614. The content provider system may comprise databases storing vast amounts of historical data associated with previous searches and transactions, which may be correlated with users, including various demographic information about the users (e.g., age, gender, occupation, geographic location, nationality, etc.). Because there is so much data to parse and search through, to simplify and streamline searching through these datasets is to collapse the data at 604 and then group the data 706. The dataset searches may be grouped based on marketplace, date, session, keywords, etc. However, because searching through large datasets may be inefficient, some information may be lost on refinements and/or aliases.

Annotating within sessions 608 may include designing an annotator 610 and then defining the scope of the annotation 612. Annotating may help to create training data and training the annotator. At 614, when extracting query chain information, the content provider system according to an embodiment may graph the structure of the query chains 616, which may include producing the annotation. The structure may then be outputted 618 as a visualization, f as shown in the display in FIG. 3, as an example. In the method shown in FIGS. 5 and 6, the self-defined query groups may include group searches by marketplace, session, user, keywords, alias, and/or refinements. In some embodiments, an intuitive consistent ranking result may be shown based on the grouping.

Broad queries are problematic because they result in large recall (e.g., overwhelming amount of search results) and they often result in rare positive behavior (e.g., low probability of relevant search results). In an alternative embodiment, the problems associated with broad queries may be addressed with specification chains that reduce recall and result in more adds and purchases (e.g., conversions from search queries to completed purchase transaction). Specification chains may be located based at least in part on decision rules including extending query keywords, adding refinements to the query, going into specific categories of products, etc. Subsequently the products that are eventually purchase and/or added may be credited to the first (e.g., upstream) query. The relevance between the conversion and the upstream query may then be recorded and utilized to train models to better detect and annotate future query chains. machine learning tracking model.

Figure 7:
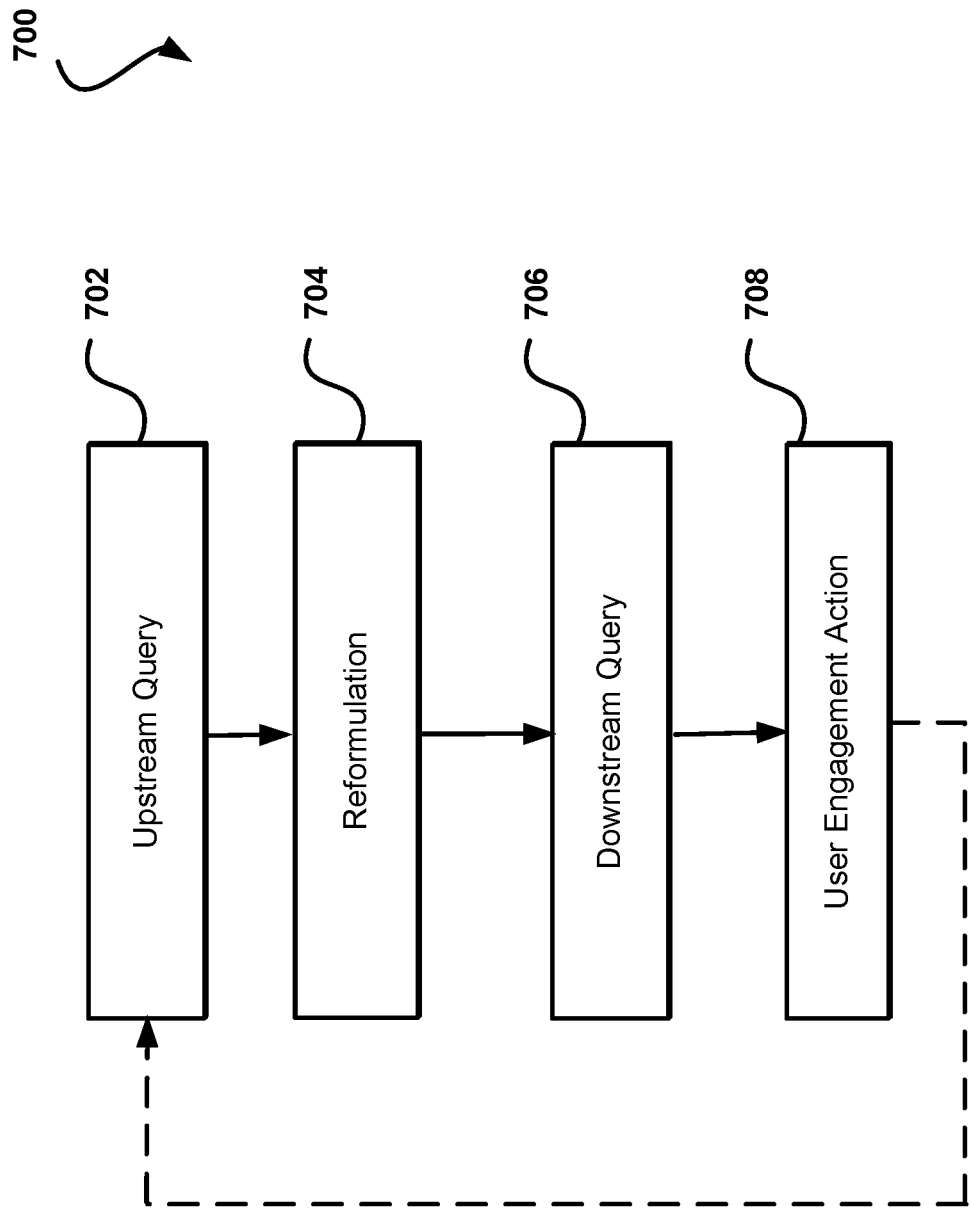
FIG. 7 illustrates an example method of iterative analysis of query chains in accordance with one embodiment.

FIG. 7 illustrates a high-level overview of an example method 700 of using query chain data to train models according to an alternative embodiment of the present disclosure. Initially, a user may enter a first, or upstream query, at 702. The user may reformulate the upstream query at 704, which may be based on the reformulation model described in Table 1, as well as the decision rules in Table 2 and Table 3. The user may then provide a downstream query at 706, which may lead to a user engagement action at 708. Examples of user engagement action may include, but are not limited to, completed purchase transactions, placing a product in an online shopping cart, reserving an item online, saving a website hyperlink as a bookmark, clicking on a hyperlink, etc. Steps 702, 704, 706, and 708 may be performed by a user interacting with a content provider system. When completed user engagement action has occurred at 708, then the content provider system, on the back end, as illustrated by the dashed arrow, may feed the user engagement action back to help train the behavior model to better understand subsequent upstream queries 702 such that a query chain may be predicted from the next upstream query based on the previous user engagement action at 708.

Training the behavioral models and having the relevance between queries be an iterative process can help the content provider system of the present disclosure to identify long-term end user engagement. Every successful conversion may then be propagated back and may be especially helpful in reformulating broad queries into a better downstream query to return results that will be relevant to the user. In this embodiment, the content provider system may also gather and aggregate all the long-term query chains from a plurality of users to build a user behavior model or train an existing user behavior model. The behavioral model may be used to detect query chains more accurately and/or fine tune how query chains are annotated into the different types of chains (e.g., chains of interest, chains to purchase, chains to add, etc.).

Figure 8:
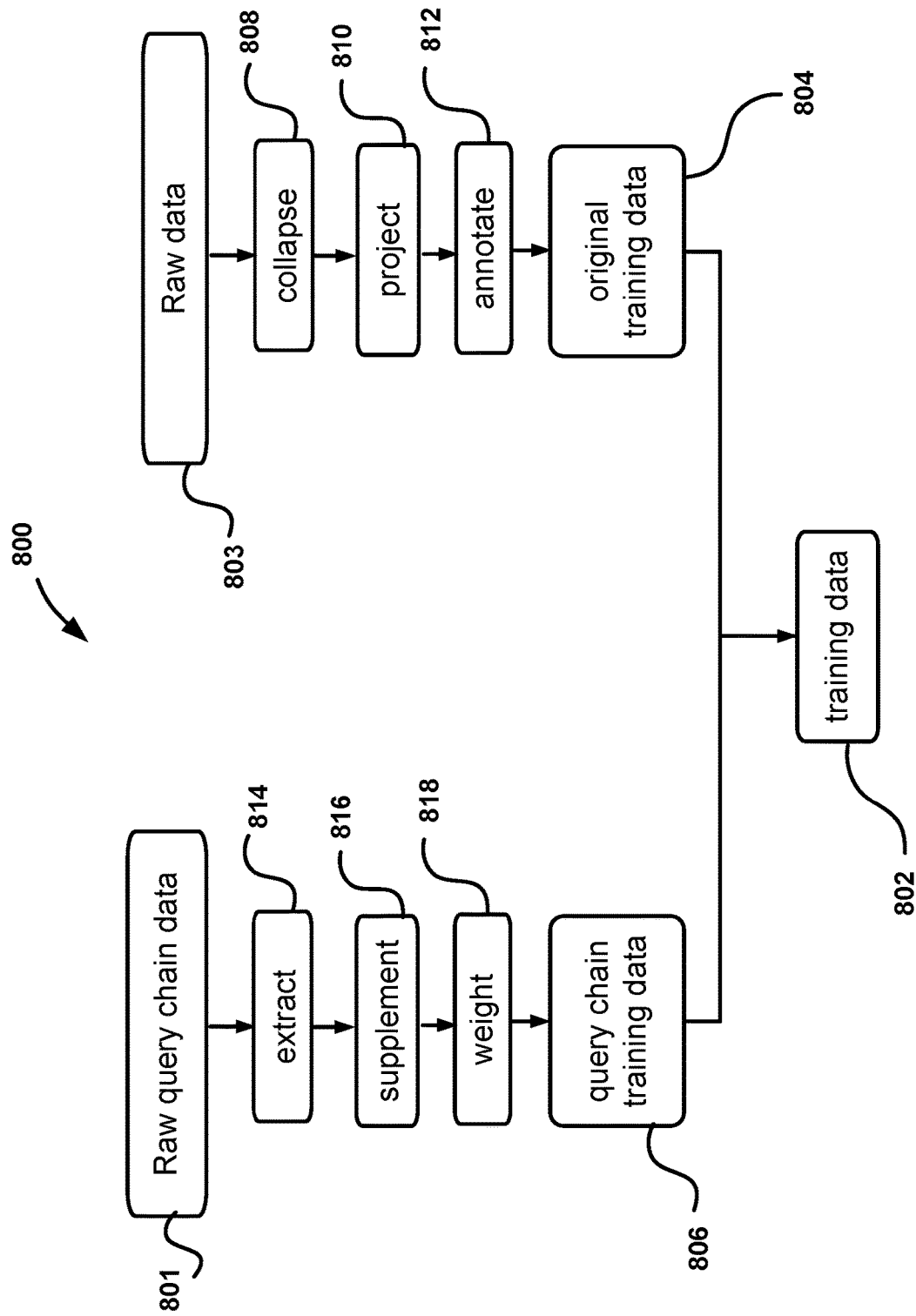
FIG. 8 illustrates an example diagram of training data in accordance with one embodiment.

FIG. 8 illustrates an example method 800 of how data may be processed to build and train models for user behavior. Initially, the content provider system may include raw query chain data 801 and raw data 803. The raw data 803 may include aggregated historical data of the plurality users. The raw query chain data 801 may include previously detected and annotated query chains. The raw data 803 may be collapsed 808, projected 810, and annotated 812, as discussed in FIG. 6 as an example, to generate original training data 804. The raw query chain data 801 may be extracted 814 to identify various features, supplemented with additional data 816, and then the features may be weighted 818 to generate query chain training data 806. Extracting features 814 may include text-based features and/or other metadata of the search results. Supplemental data 816 may include machine-learned classifiers, for example. Weighting 818 the features may involve assigning a weight value to queries upstream or queries downstream. The query chain training data 806 and the original training data 804 may then be merged to create a complete set of training data 802 used to train behavioral models of user behavior, including long term relevance and engagement with the user.

According to an embodiment of the present disclosure, query chain classifiers may be created from positive examples and negative examples, such that the classifiers are trained to identify query chains. The content provider system may train a model such that the behavioral model may predict query chains, which represent predictions of user behavior, for example being able to predict, from a user's initial search query, a product that will result in a completed purchase transaction. Understanding extracted features may help the content provider system to train the behavioral model may include text-related features, such as overlapping keywords, context, equivalent words, etc.

Figure 9:
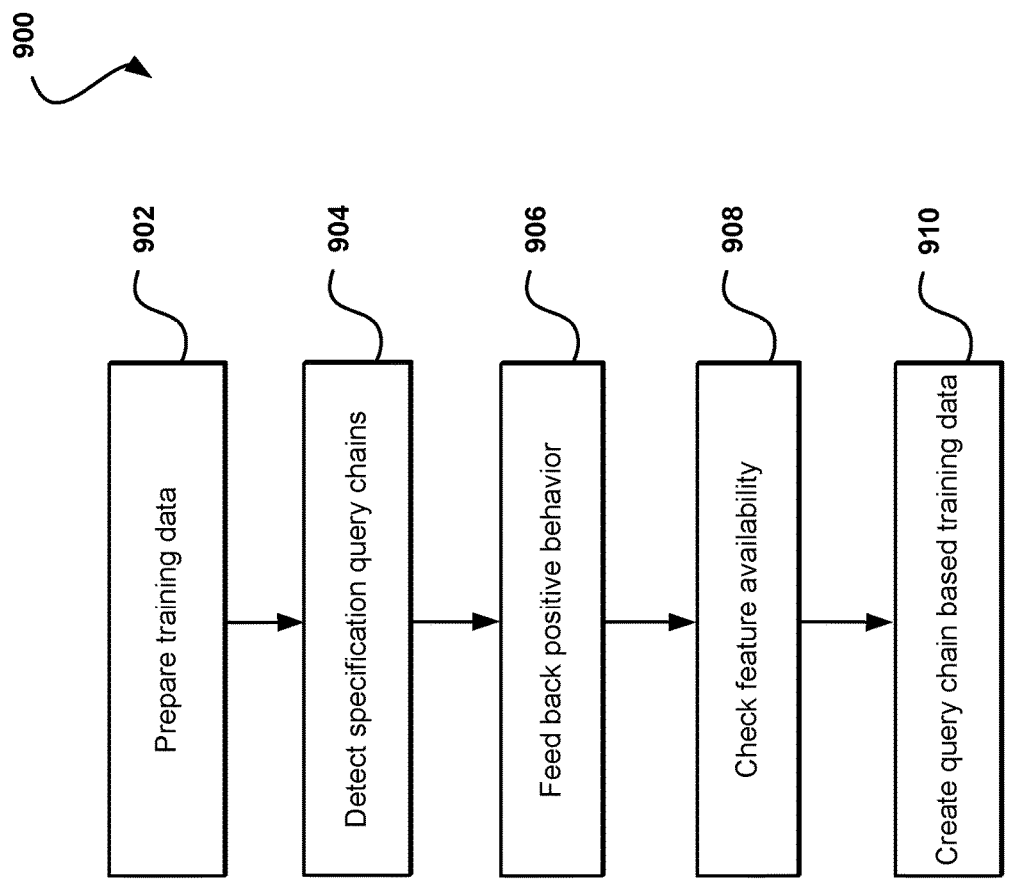
FIG. 9 illustrates an example method of creating training data for query chains in accordance with one embodiment.

FIG. 9 illustrates an example method 900 to demonstrate how the data in FIG. 8 may be used to create query chain training data according to an embodiment of the present disclosure. At 902, the training data may first be prepared for analysis. The training data may be collected from a specific period in time, and from specific users or a general population of users. In preparing the training data, the training data may be categorized into various query groups. From the training data, the content provider system may then detect specification query chains at 904. To detect a specification query chain, the content provider system may zoom into the training data based on decision rules to determine if queries are chained, such as those shown in Table 2 and Table 3, as an example. Detecting specification chains may result in reduced recall, i.e., produce relevant targeted results as opposed to overbroad results (e.g., large recall). Additional query groups may be discovered as part of the specification chain.

At 906, positive behavior, such as a completed conversion (e.g., purchase transaction), may be fed back. For example, completed purchases within the query group identified may be fed back to create new query pairs as positive. In some embodiments, the positive behavior that is fed back may also include distinctive keywords identified from the current conversion. Additionally, in another embodiment, negative behavior or negative query chains, may also be fed back into the behavioral model. The negative behavior or negative query chains indicate queries that resulted in incomplete transactions, and this negative data is also valuable in training the behavioral model for user behavior. Subsequently at 908, the content provider system may check for feature availability and collect query pairs having extracted features. For example, query pairs with specific keywords may be collected for a particular extracted feature. At 910, training data may then be created based on the query pairs information. For example, extracted query pairs with a given ratio on negative behavior for a particular mission may be used to train future model. Additional query groups may be created based on the training data at this step as well. A query pair includes a search query term that may be paired positively with a product identifier.

Figure 10:
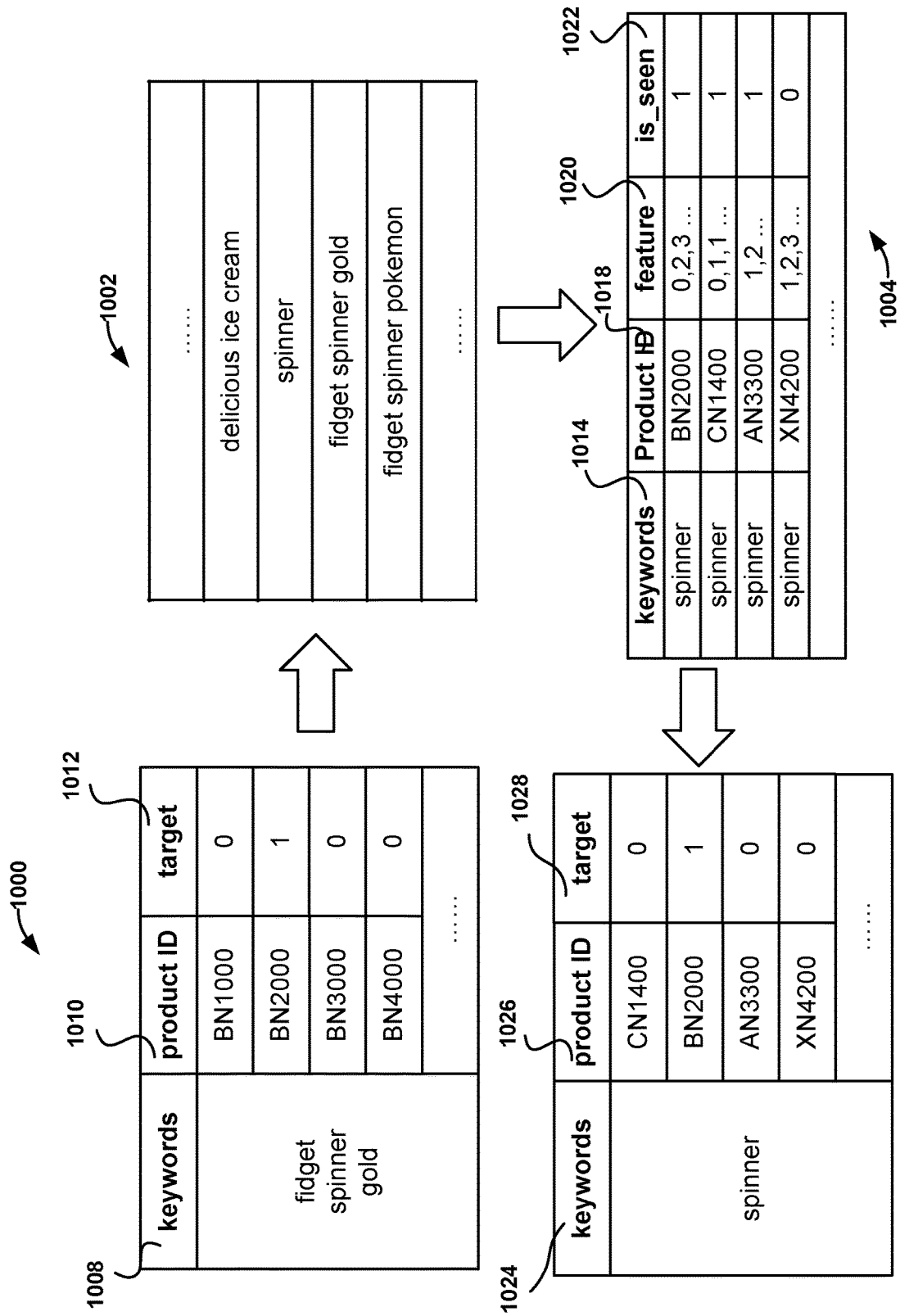
FIG. 10 illustrates example results of an example method of creating training data for query chains in accordance with one embodiment.

FIG. 10 illustrates an example of training data processed by the method 900 in FIG. 9, according to various embodiments. As shown in example 1000, a query may include keyword(s) "fidget spinner gold" 1008 that are paired with a plurality of product identifiers 1010. Examples of product identifiers may include, but are not limited to Amazon Standard Identification Number (ASIN), universal product code (UPC), international standard book number (ISBN), etc. Product identifiers may also refer to document or file identifiers to determine unique electronic documents and/or digital files. The content provider system may indicate in 1012 whether each product identifier is an actual target of the query, which may be determined based on the mission of the session and/or an intent of the user (e.g., shopping intent, search intent, etc.). Subsequently at 1002, the content provider system may conduct a dataset search (e.g., correlate with historical queries, searches, and/or transactions) to determine query groups based on keywords, for example. In this example the original keyword in the query 1008 may be correlated with keywords "spinner" and "fidget spinner gold" as more relevant.

In this example, at 1004, the content provider system may then pair the reformulated keyword 1014 "spinner" with updated product identifiers 1018. Each product identifier 1018 may be unique to each product associated with the keyword, for example each product identifier 1018 may indicate a different type or model of "spinner." Additionally, each product identifier 1018 may be associated with distinguishing features 1020. In some embodiments, the content provider system may also indicate at 1022 whether the user views each product identifier 1020. The content provider system may then, at 1006, re-pair the reformulated keyword 1024 "spinner" with updated product identifiers 1026, and additionally indicate whether each product identifier 1026 is a target of the session at 1028.

Figure 11:
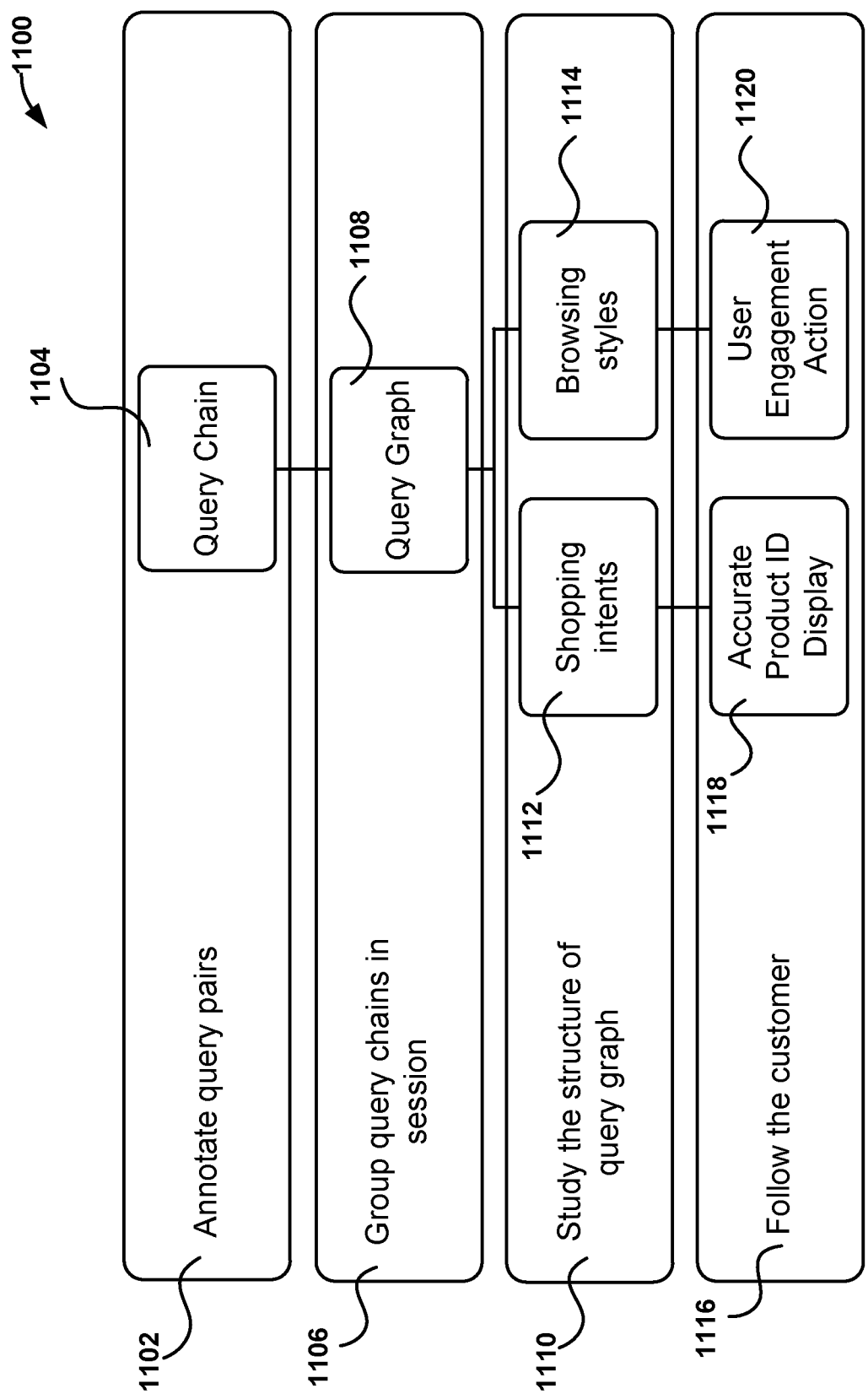
FIG. 11 illustrates an example method of determining long term relevance using query chains in accordance with one embodiment.

In another embodiment, the content provider system may also analyze and monitor post-purchase behavior, for example, incorporate additional queries after a purchase. FIG. 11 illustrates an example method 1100 of predicting user behavior according to various embodiments of the present disclosure. For example, after a purchase, the user may realize that the purchased product was not what the user intended when the original search query was entered. Alternatively, after purchase, the user may be provoked to conduct subsequent searches and queries, for example, for related items to the purchased product. At 1102, the content provider system may annotate query pairs, which creates a query chain 1104. The query chains may then be grouped in the session at 1106. The grouping of query chains within the session creates a query graph 1108, which can be represented by a visualization of the grouping of query chains (e.g., see FIG. 4 as an example).

The content provider system may then analyze the structure of the query graph at 1110. The query chains in the graph may be analyzed at 1110 to determine shopping intents 1112 and/or search browsing styles 1114. Query chains in the graph may be sorted by product identifiers, price, category, regions, etc. At 1116, the content provider system may follow the user in that post-purchase user behavior is monitored and/or predicted. For example, the content provide system may provide product identifiers for display 1118 to the user in order to accurately determine which product identifiers are the target of the user's shopping mission based on the shopping intents 1112. Examples of product identifiers may include, but are not limited to Amazon Standard Identification Number (ASIN), universal product code (UPC), international standard book number (ISBN), etc. Product identifiers may also refer to document or file identifiers to determine unique electronic documents and/or digital files. The content provider system may also determine whether an effective interaction 1120 has occurred based on the browsing styles 1114 of the user. Embodiments of the present disclosure may then use post-purchase behavior to further fine tune and hone the reformulation of queries and improve relevance and annotation of queries.

As described herein, embodiments of the present invention provide systems and methods for determining long term relevance between users and products of interest as a query chain. Products of interest may initially be relevant products that users queried for in a search and a conversion occurs when the user eventually completes the query by purchasing the relevant product. Query chains may be used, according to embodiments of the present disclosure, to improve and enhance product search, as previous query chains of a particular customer, or a body of users, may be analyzed for patterns. Query chains may be mined from a database storing raw data between users and products. Additionally, query chain information may be incorporated into training behavioral models that predict user behavior from a search query and conversion into a purchase.

Figure 12:
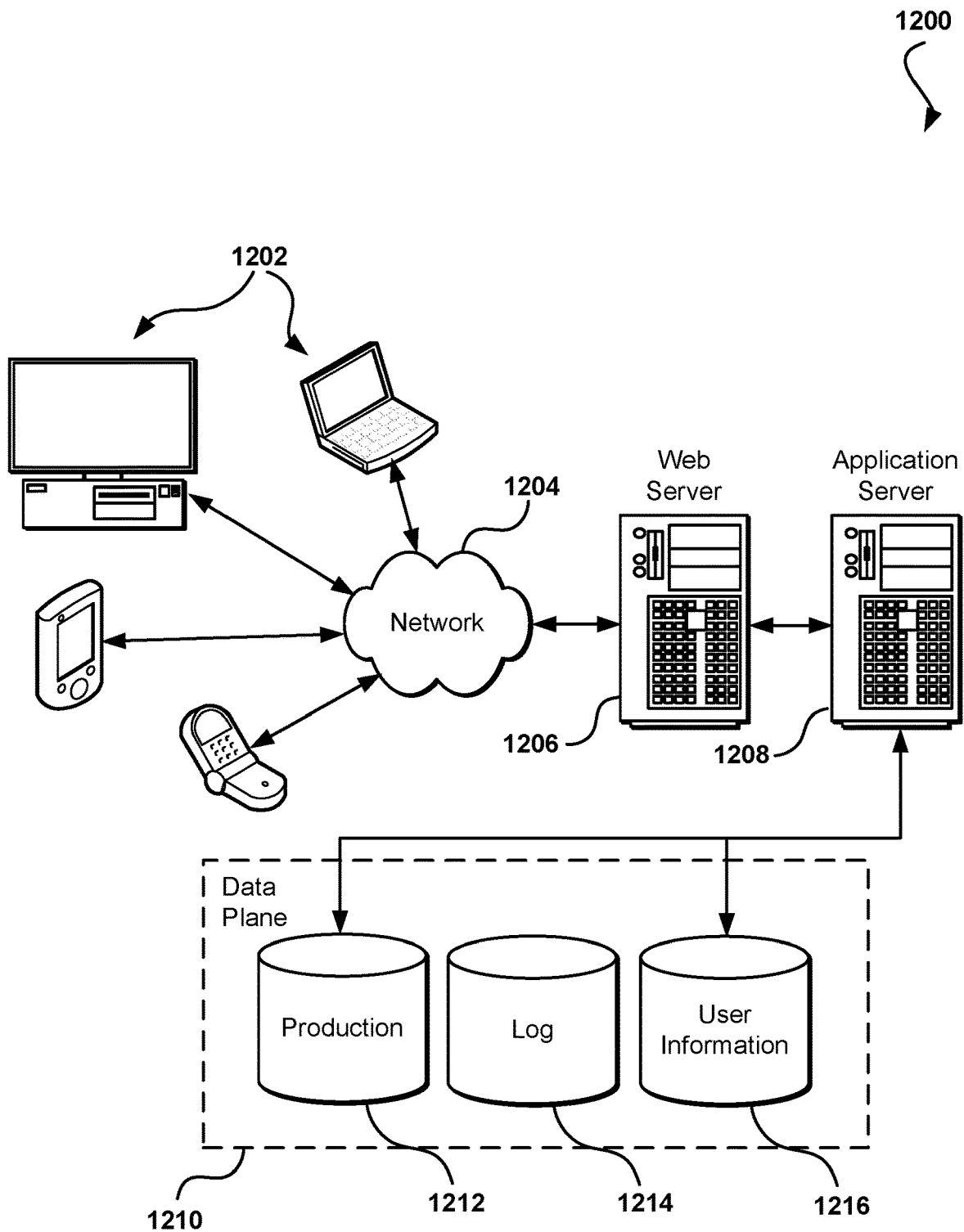
FIG. 12 illustrates an environment in which various embodiments can be implemented.

FIG. 12 illustrates an example of an environment 1200 for implementing aspects in accordance with various embodiments. As will be appreciated, although a Web-based environment is used for purposes of explanation, different environments may be used, as appropriate, to implement various embodiments. An electronic client device 1202 can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for Communication communicating via such a network are well known and will not be discussed herein in detail. over the network can be enabled by wired or wireless connections, and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a plurality of resources, servers, hosts, instances, routers, switches, data stores, and/or other such components defining what will be referred to herein as a data plane 1240, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 1206, application server 1208 and similar components can be considered to be part of the data plane. The handling of all requests and responses, as well as the delivery of content between the client device 1202 and the application server 1208, can be handled by the Web server. It should be understood that the Web and application servers are not required and are merely example components, as structured code can be executed on any appropriate device or host machine as discussed elsewhere herein.

The data stores of the data plane 1240 can include several separate data tables, databases, or other data storage mechanisms and media for storing data relating to a particular aspect. For example, the data plane illustrated includes mechanisms for storing production data 1212 and user information 416, which can be used to serve content for the production side. The data plane also is shown to include a mechanism for storing log data 1214, which can be used for purposes such as reporting and analysis of the user data, including gathering and aggregating the large amounts of data from multiple users on the network. It should be understood that there can be many other aspects that may need to be stored in a data store, such as for page image information and access right information, which can be stored in any of the above listed mechanisms as appropriate or in additional mechanisms in the data plane 1240. The data plane 1240 is operable, through logic associated therewith, to receive instructions from the application server 1208 and obtain, update, or otherwise process data, instructions, or other such information in response thereto. In one example, a user might submit a search request for a certain type of item. In this case, components of the data plane might access the user information to verify the identity of the user, gather user information, and access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limiting to the scope of the disclosure.

An environment such as that illustrated in FIG. 12 can be useful for various content providers or other such entities, wherein multiple hosts and various types of resources might be used to perform tasks such as serving content, authenticating users, gathering user data and information, analyzing and aggregating user data, predicting user behavior, allocating resources, or performing any of a number of other such tasks. Some of these hosts may be configured to offer similar functionality, while other servers might be configured to perform at least some different functions.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for determining long-term relevance, comprising:
   receiving, in a first session, a first query, the first query including one or more terms;
   analyzing the one or more terms by accessing a historical datastore to correlate the one or more terms with historical data, the historical data including at least one previous corresponding transaction or previous query chain;
   receiving a reformulation of the first query based at least in part on the historical data;

determining a relevance between the reformulation of the first query and a second query, the relevance based at least in part on at least one decision rule;

detecting a query chain based at least in part on the relevance, the query chain including the first query and the second query;

annotating the query chain into a category relating the first query to the second query;

storing the query chain in a query chain datastore, the query chain datastore including a plurality of query chains;

generating a behavioral model based at least in part on the plurality of query chains in the query chain datastore;

detecting a positive query chain, wherein the positive query chain is a query that results in a completed purchase transaction;

propagating the positive query chain with the completed purchase transaction into the behavioral model;

detecting a negative query chain with respect to a subsequent query; and propagating the negative query chain into the behavioral model.

2. The computer-implemented method of claim 1, wherein analyzing the one or more terms further comprises:

searching the historical datastore for the one or more terms;

collapsing the historical data; and grouping the historical data.

3. The computer-implemented method of claim 1, wherein annotating the query chain further comprises:

creating one or more query groups based at least in part on metadata associated with the one or more terms in the first query or the second query of the first session;

modifying the one or more query groups for the first session;

in a second session, annotating queries chains from the second session; and storing the query chains from the second session in the query chain datastore.

4. The computer-implemented method of claim 1, further comprising:

predicting a third query or a subsequent positive query chain based at least in part on the behavioral model.

5. The computer-implemented method of claim 1, wherein the negative query chain is a query that results in an incomplete transaction.

6. A computer-implemented method for determining long-term relevance, comprising:

receiving a first query, the first query including one or more terms;

analyzing the one or more terms, the one or more terms associated with historical data;

defining at least one decision rule based at least in part on the historical data;

calculating a level of relevance between the first query and a second query, the level of relevance based at least in part on the at least one decision rule and a reformulated first query;

detecting a query chain based at least in part on the level of relevance, the query chain including the first query and the second query;

determining whether the query chain is a positive query chain or a negative query chain based at least in part on whether the first query or the second query resulted in a completed purchase transaction;

generating a behavioral model based at least in part on the query chain; and propagating the positive query chain, with the completed purchase transaction for a positive query chain, into the behavioral model.

7. The computer-implemented method of claim 6, further comprising:

detecting a reformulation of the first query based at least in part on features associated with the one or more terms;

extracting at least one textual, semantic, or temporal feature from the features associated with the one or more terms;

calculating a confidence value based at least in part on the at least one feature extracted; and calculating the level of relevance based at least in part on the confidence value.

8. The computer-implemented method of claim 7, wherein the at least one textual feature includes a cosine distance, a Levenshtein distance, one or more shared terms, a prefix, a suffix, or a query length.

9. The computer-implemented method of claim 7, wherein the at least one semantic feature includes an identical product identifier associated with the one or more terms, a product type, or a query alias.

10. The computer-implemented method of claim 7, wherein the at least one temporal feature includes a temporal window in between the first query and the second query, an elapsed time, or a time of day.

11. The computer-implemented method of claim 6, wherein the at least one decision rule includes an extension rule, the extension rule appending additional terms to the one or more terms in the first query.

12. The computer-implemented method of claim 6, wherein the at least one decision rule includes a correcting rule, the correcting rule remedying errors in the first query.

13. The computer-implemented method of claim 6, further comprising:

annotating the query chain into a category relating the first query to the second query, wherein the category is selected from a plurality of categories including a generalization, a specification, a rephrase, a parallel move, and a mission change;

storing the query chain in a query chain datastore, the query chain datastore including a plurality of query chains, wherein the query chain includes the category; and providing for display at least the query chain in the first session, the query chain including the first query, the second query, and the category.

14. A non-transitory computer readable storage medium storing instructions for determining long-term relevance, the instructions when executed by a processor causing the processor to:

receive a first query, the first query including one or more terms;

analyze the one or more terms, the one or more terms associated with historical data;

define at least one decision rule based at least in part on the historical data;

calculate a level of relevance between the first query and a second query, the level of relevance based at least in part on the at least one decision rule and a reformulated first query;

detect a query chain based at least in part on the level of relevance, the query chain including the first query and the second query;

determine whether the query chain is a positive query chain or a negative query chain based at least in part upon whether the first query or the second query resulted in a completed purchase transaction;

store the query chain in a query chain datastore, the query chain datastore including a plurality of query chains;

generate a behavioral model based at least in part on the plurality of query chains in the query chain datastore; and propagate the positive query chain with the completed purchase transaction for a positive query chain, into the behavioral model.

15. The non-transitory computer readable storage medium of claim 14, wherein the instructions when executed further cause the processor to:

extract at least one feature associated with the one or more terms;

calculate a confidence value based at least in part on the at least one feature extracted; and calculate the level of relevance based at least in part on the confidence value.

16. The non-transitory computer readable storage medium of claim 15, wherein the at least one feature includes a cosine distance, a Levenshtein distance, one or more shared terms, a prefix, a suffix, a query length, a temporal window in between the first query and the second query, an elapsed time, a time of day, an identical product identifier associated with the one or more terms, a product type, or a query alias.

17. The non-transitory computer readable storage medium of claim 14, wherein the at least one decision rule includes appending additional terms to the one or more terms in the first query or remedying errors in the first query.

18. The non-transitory computer readable storage medium of claim 14, wherein the instructions when executed further cause the processor to:

annotate the query chain into a category relating the first query to the second query;

store the query chain in a query chain datastore, the query chain datastore including a plurality of query chains, wherein the query chain includes the category; and provide for display at least the query chain in the first session, the query chain including the first query, the second query, and the category.

19. The non-transitory computer readable storage medium of claim 18, wherein the category is selected from a plurality of categories including a generalization category, a specification category a rephrase category, a parallel category, and a mission change category, the generalization category including queries that return broad results, the specification category including queries that return narrow results, the rephrase category including queries having synonymous terms, the parallel category including queries for a product having different characteristics, the mission change category including queries for different products.

20. The non-transitory computer readable storage medium of claim 14, wherein the instructions when executed further cause the processor to:

detect a negative query chain, wherein the negative query chain is a query that results in an incomplete transaction, the incomplete transaction stored as historical data;

propagate the negative query chain into the behavioral model; and predict a third query or a subsequent query chain based at least in part on the behavioral model.

* * * * *